United States Patent
Woodbridge

(10) Patent No.: US 6,791,205 B2
(45) Date of Patent: Sep. 14, 2004

(54) RECIPROCATING GENERATOR WAVE POWER BUOY

(75) Inventor: Thomas C. Woodbridge, Satellite Beach, FL (US)

(73) Assignee: Aqua Magnetics, Inc., Satellite Beach, FL (US)

(*) Notice: Subject to any disclaimer, the term of this patent is extended or adjusted under 35 U.S.C. 154(b) by 181 days.

(21) Appl. No.: 10/255,172

(22) Filed: Sep. 27, 2002

(65) Prior Publication Data

US 2004/0061338 A1 Apr. 1, 2004

(51) Int. Cl.⁷ .............................................. F03B 13/12
(52) U.S. Cl. ............................ 290/53; 290/42; 310/17; 441/16
(58) Field of Search ...................... 290/42, 53; 310/17; 441/16

(56) References Cited

U.S. PATENT DOCUMENTS

| | | | | |
|---|---|---|---|---|
| 3,362,336 A | * | 1/1968 | Kafka | 417/31 |
| 4,232,230 A | * | 11/1980 | Ames | 290/53 |
| 4,277,690 A | * | 7/1981 | Noren | 290/53 |
| 4,539,485 A | * | 9/1985 | Neuenschwander | 290/53 |
| 5,176,552 A | * | 1/1993 | Kuboyama et al. | 441/16 |
| 5,347,186 A | * | 9/1994 | Konotchick | 310/17 |
| 5,696,413 A | | 12/1997 | Woodbridge | |
| 5,842,838 A | * | 12/1998 | Berg | 417/331 |
| 6,020,653 A | | 2/2000 | Woodbridge | |
| 6,109,029 A | * | 8/2000 | Vowles et al. | 60/398 |
| 6,140,712 A | | 10/2000 | Fredriksson | |
| 6,226,989 B1 | | 5/2001 | Fredriksson | |

* cited by examiner

Primary Examiner—Joseph Waks
(74) Attorney, Agent, or Firm—William H. Hobby, III

(57) ABSTRACT

A Reciprocating Generator Wave Power Buoy consists of a reciprocating generator rigidly attached to the underside of an ocean buoy and creates electric power from the surface ocean swells. The generator coil maintains a stable position beneath the ocean surface while the magnetic field housing reciprocates with the vertical motion of the buoy in response to interaction with swell and waves on the surface of the ocean. Damping plates attached to the generator coil inhibit the motion of the generator coil, thus keeping it in a stable position relative to the motion of the magnetic housing. The magnetic housing focuses the magnetic field through the generator coil and the relative motion between the magnetic housing and generator coil creates an electromotive force in the coil. The design of the generator provides a uniform field of single magnetic orientation throughout the entire stroke of the generator. Permanent magnets and electromagnet windings create and enhance the magnetic field of the reciprocating generator.

7 Claims, 4 Drawing Sheets

RECIPROCATING GENERATOR WAVE POWER BUOY

BACKGROUND OF THE INVENTION

The present invention relates to an electrical generator and especially to a reciprocating generator attached to the underside of an ocean buoy that produces electric power responsive to movement of the buoy riding on an oscillating fluid.

Most methods for converting reciprocating energy into electric power involve systems to mechanically rotate a generator. They convert the motion of the ocean swells into linear motion of another fluid resulting in a loss of efficiency. These systems lose more efficiency during the step of converting the linear fluid motion into rotating turbine motion that drives the generator. Prior art wave generating systems also use wave motion to drive a hydraulic pump to force a fluid through a turbine connected to an electric generator.

One such prior art system uses wave motion to force air through hollow shafts and uses a by-driectional turbine placed in the air shaft to produce electric power. An oncoming wave forces air up the shaft and the receding wave sucks air back down the shaft. The air motion in the shaft then turns the turbine that drives the electric generator. In the Fredriksson U.S. Pat. Nos. 6,140,712 and 6,226,989, a Wave Energy Converter uses a tube attached to the underside of an ocean buoy. A reciprocating piston inside the tube pumps water up the tube to turn a turbine that turns a rotating generator. Each of these systems suffer from losses of efficiency in the process of converting wave motion into movement of a fluid and in turn uses the fluid motion to turn a turbine that turns a rotating generator.

The reciprocating generator power buoy of the present invention uses a linear generator that directly converts the vertical motion of ocean swells into electric power. This linear generator eliminates the conversion steps required to turn a standard rotating generator thereby eliminating the efficiency losses incurred by other systems. The reciprocating generator focuses a uniform magnetic field through the generator coil for the entire stroke of the generator. This design increases the efficiency of converting the energy in ocean swells and waves into electric power. The reciprocating generator consists of a permanent magnetic core that reciprocates with respect to a stationary coil that is annularly wound on a bobbin. The bobbin coil resides within a coaxial bore formed with a center pole flux core and an outer pole flux core on the exterior of the annular bore, both of which can be lined with permanent magnets. The arrangement of the magnets is in such a manner to create a uniform magnetic field of a single magnetic orientation throughout the entire length of the relative motion between the stationary bobbin coil and the magnetic core. The bobbin coil remains relatively stationary by means of damping plates attached to the bobbin coil that extend out and around the magnetic core. In addition, an electromagnetic winding mounted behind each permanent magnet receives a small portion of the electric energy generated by the relative motion between the magnetic core and the bobbin coil. This in turn increases the magnetic field within the coaxial bore, which increases the output of the reciprocating generator to the maximum energy available in the passing ocean swell.

SUMMARY OF THE INVENTION

A Reciprocating Generator Power Buoy generates electric power from the surface ocean swells. Damping plates attached to the generator coil maintain the coil in a stable position as the generator's magnetic housing, solidly connected to the underside of an ocean buoy, reciprocates up and down with the passing ocean swells. A solid spacer between the buoy and the reciprocating generator locates the generator deep enough under the buoy such that the generator is in still water. This also inhibits the rocking motion of buoy allowing for vertical up and down motion. The magnetic housing focuses a magnetic field through the generator coil, creating an electromotive force in the coil from the relative motion between the coil and the magnetic housing. The magnetic housing consists of a center magnetic core and a series of outer magnetic cores. An end cap on both sides of the generator connects the center magnetic core to the outer magnetic cores. Electromagnetic windings enhance the initial magnetic field created with permanent magnets.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
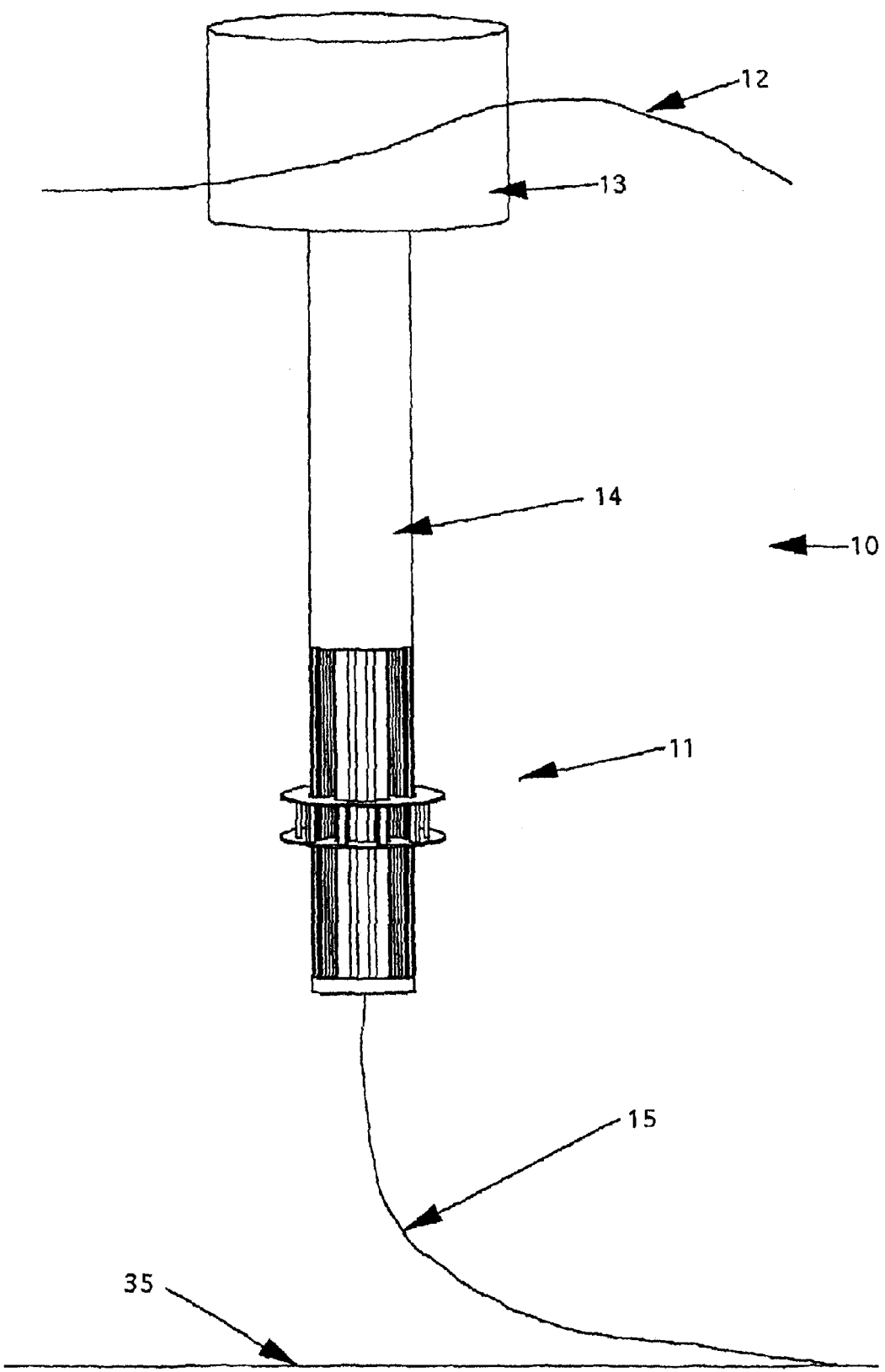
FIG. 1 is an isometric view of the Reciprocating Generator Power Buoy in accordance with the present invention.
Figure 2:
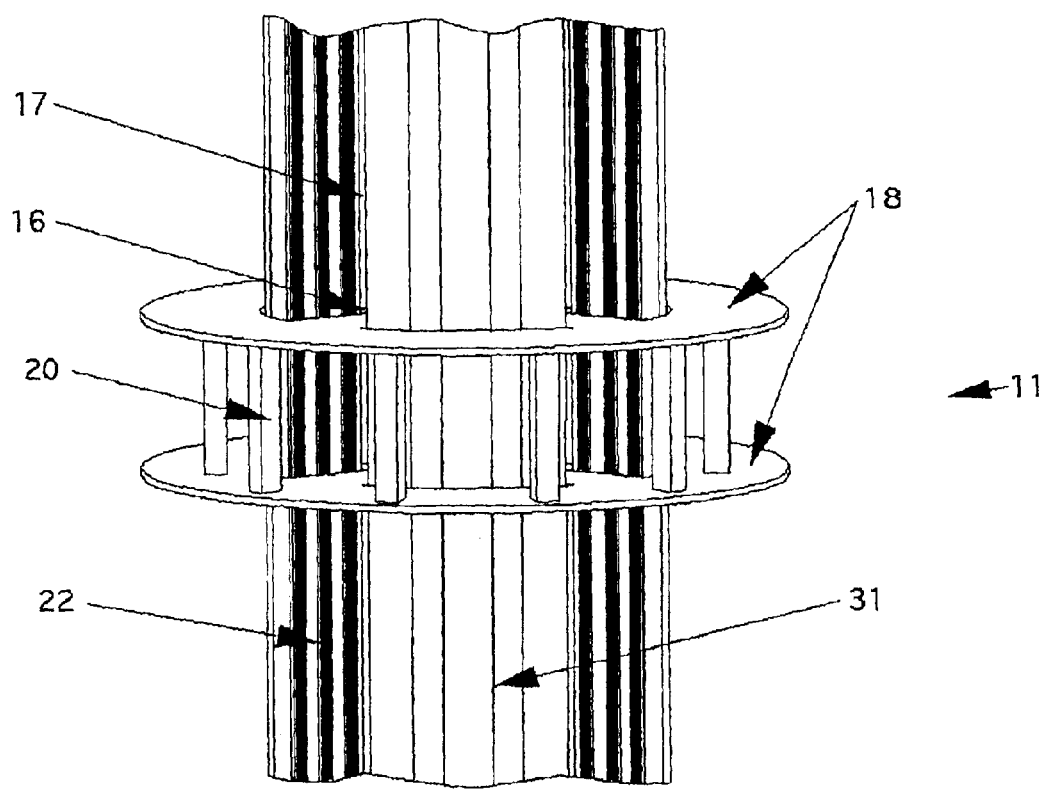
FIG. 2 is an isometric view of the reciprocating generator porting of power buoy shown in FIG. 1.
Figure 3:
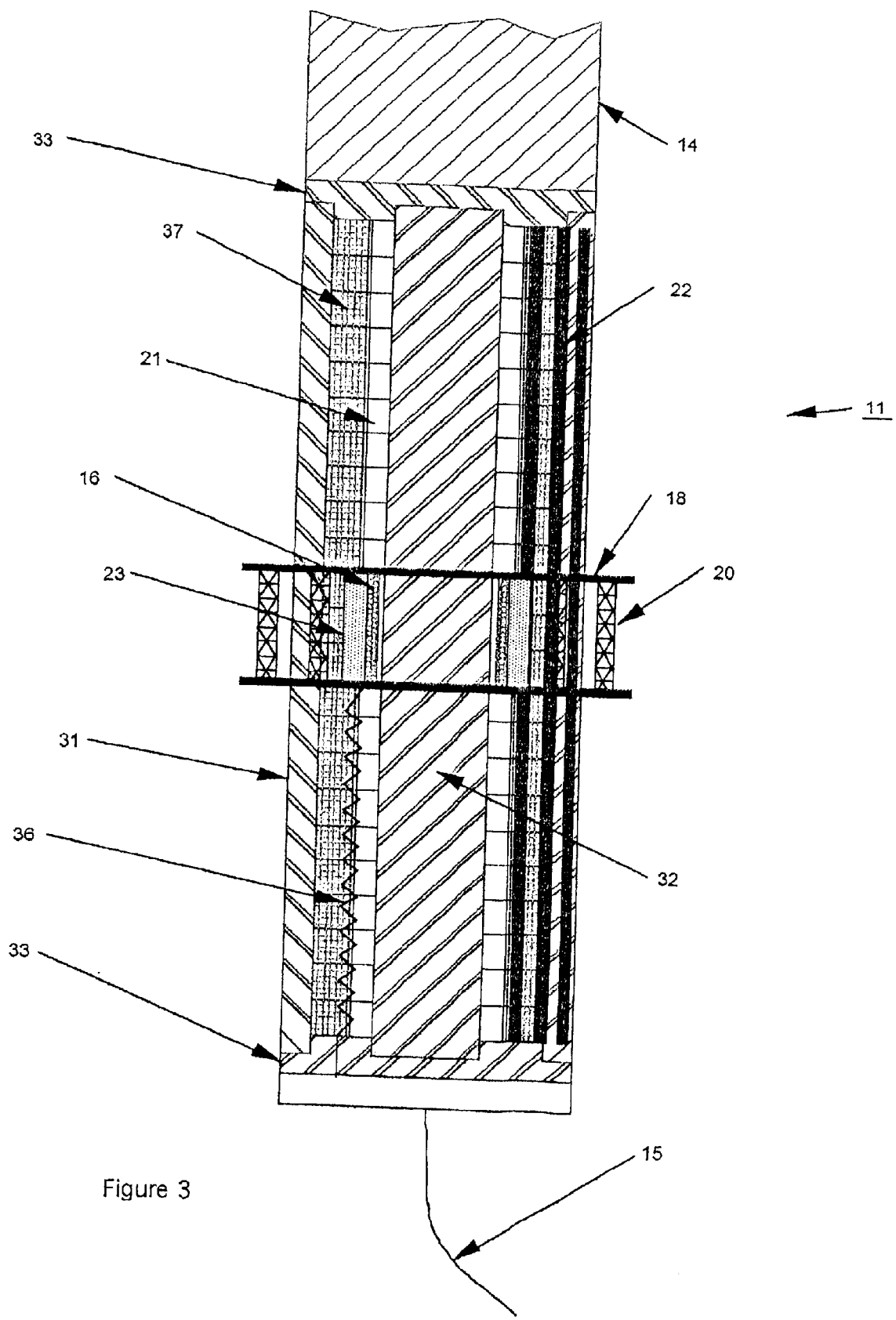
FIG. 3 is a side sectional view of the reciprocating generator shown in FIG. 1 and FIG. 2.

Referring to the drawings, FIG. 1 through FIG. 4 show an electric generator 11 for generating electric power from ocean swells in a body of water 12, having a magnetic core supported on the underside of a buoy 13. A rigid structure 14 connects the reciprocating electric generator 11 to the buoy 13 and is of such a length as to place the generator 11 in still water below the surface swells and wind waves. A single or multiple slack mooring cable 15 maintains the reciprocating generator power buoy 10 in location while allowing vertical movement.

The magnetic core has an annular elongated bore 17 extending there into and has and annular wound generator coil 16 slidably mounted in the elongated annular bore. The magnetic core has gaps in the outer core to allow extension of damping plates 18 attached to the ends of the generator coil 16. The damping plates 18 extend out from the generator coil 16 and connect in flat damping rings that encircle the outside of the magnetic core 31. Vertical damping plate supports 20 connect the upper and lower damping plates 18 to provide structural integrity. The damping plates 18 maintain the generator coil 16 in a stable position while the magnetic core 31, 32, & 33 reciprocates linearly in response to external forces acting on the buoy by the passing ocean swells and wind waves. Linear bearing material 22 mounted on the sides of the outer magnetic core 31 damping plates gaps where the damping plates 18 and outer magnetic core 31 make contact, allowing the relative motion between the generator coil/damping plates 16 and magnetic core housing to occur freely. Neutral buoyancy tanks 23 maintain the generator coil 16 at a specific depth below the buoy 13 and in the center of the magnetic housing stroke length.

Pluralities of permanent magnets 21 mounted in the annular bore create a uniform magnetic field so that when the magnetic core moves up and down with respect to the stationary generator coil 16, electric power production occurs within the generator coil 16. Electromagnetic windings in series with the permanent magnets 16 receive a small portion of the electric energy generated in the generator coil 16. This, in turn, generates an electromagnetic field within the magnetic core, thereby increasing the magnetic field initially created by the permanent magnets 21, and hence increases the magnetic field in the generator annular bore 17 air gap. The increase in the magnetic field increases the efficiency in the power output of the linear generator. An approaching ocean swell raises the buoy and pulls the generator magnetic housing linearly upward while the generator coil 16 remains in a stationary position. The weight of the magnetic housing and generator-buoy connecting structure allows gravity to pull the magnetic housing back down as the swell passes the buoy.

The relative motion between the magnetic field of the magnetic housing and generator coil 16 creates an electric voltage in the generator coil. Electric current flowing through the generator coil 16 creates an induced force on the generator coil 16. The damping plates 20 attached to the coil extending out into the still water inhibit the movement of the coil caused by the induced force, thereby keeping the coil 16 stationary in relation to the movement of the magnetic housing. The coiled electric transmission wire 36, connected to the generator coil 16, transmits electric power from the generator coil 16 to commercially available electronic full wave rectification circuitry, electromagnetic winding circuitry, and external transmission lines.

Figure 4:
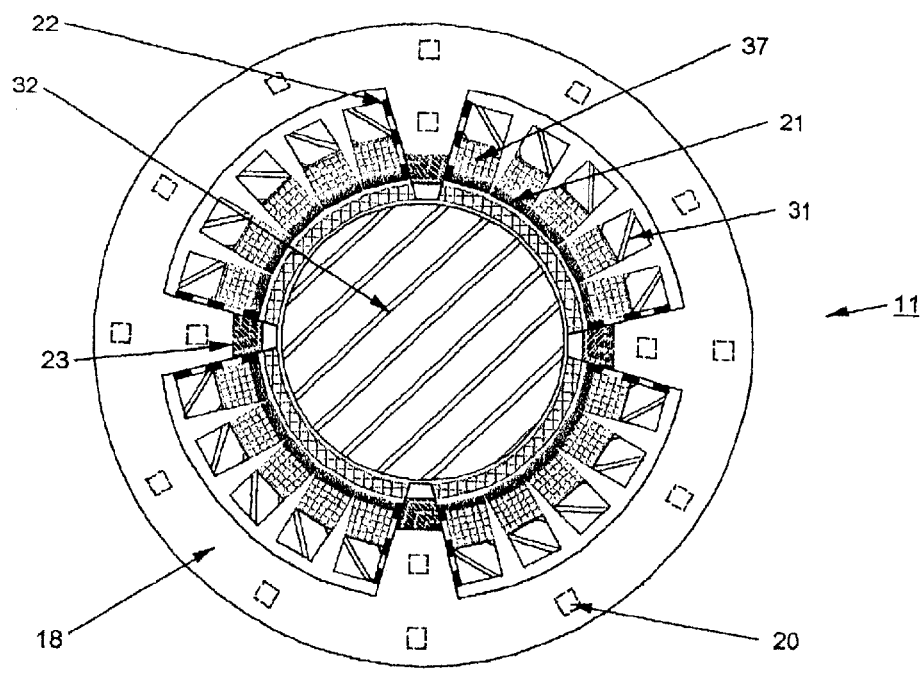
FIG. 4 is a top sectional view of the reciprocating generator shown in FIG. 1 and FIG. 2.
Figure 5:
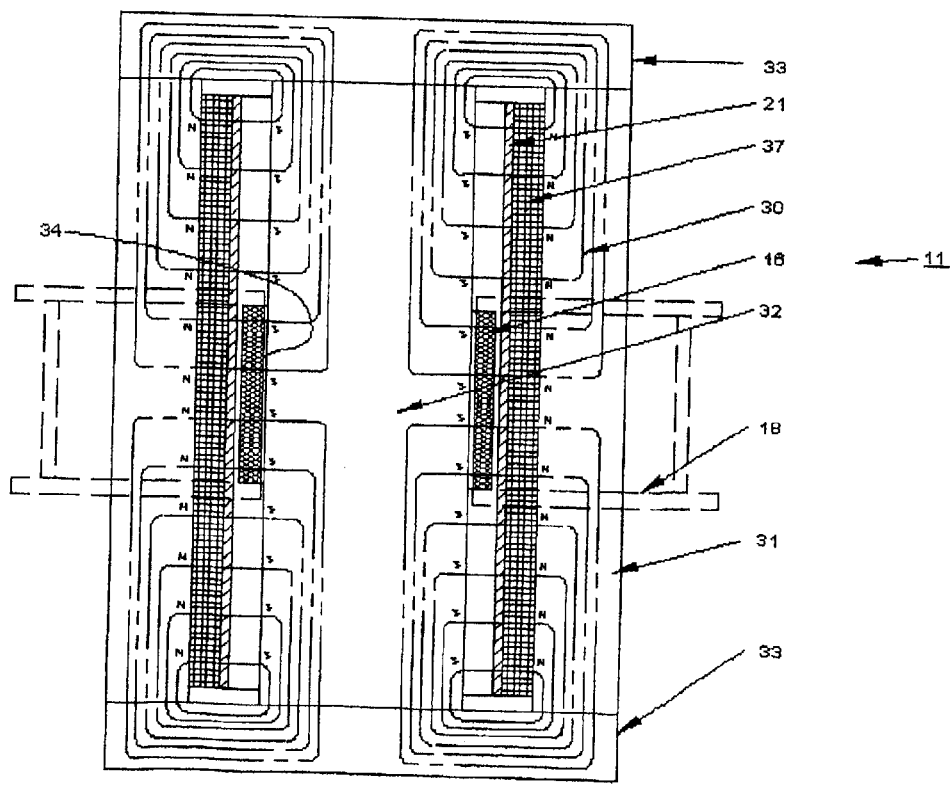
FIG. 5 is a sectional view of the reciprocating generator showing the magnetic field created in the generator.

The reciprocating electric generator 11 for use in an oscillating fluid, as shown in FIGS. 4 and 5, has a magnetic core having a magnetic center pole 32 and radially configured outer poles 31 to form an elongated bore extending thereinto and capped on both ends with end caps 33. The magnetic core is adapted to be submerged in an oscillating fluid, such as ocean water. A plurality of permanent magnets 21 are mounted in the magnetic core along the outside diameter of the annular bore. The generator coil 16 is formed with a bobbin 34 and slidably mounted in the annular bore. Damping plates 18 are rigidly attached to the upper and lower ends of the generator coil 16 at a minimum of three equally spaced annular locations and extending out from the generator coil. The damping plates 18 resists the movement of the generator coil 16 to applied forces on the coil to thereby maintain the generator coil 16 in a stable position. A magnetic core has at least three linear spaces in the outside diameter of the annular core to allow the dampening plates 18 to extend out from the generator coils 16. Damping plates connecting structure 20, connect the upper and lower dampening plates 18 to form a rigid structure. The buoy member 13 floats on the surface of an oscillated fluid while the rigid structure 14, rigidly attached to the underside of the buoy member, holds the magnetic core and generator coil 16 at a fixed distance beneath the buoy member 13 so that the magnetic core moves responsive to movement of the buoy on an oscillating fluid and the generator coil 16 remains in a generally steady position with respect to the moving magnetic core.

This allows an electric generator to produce electric power responsive to the movement of the buoy when positioning the buoy to float on the oscillating fluid.

In FIGS. 4 and 5, natural buoyancy tanks 23 can be seen mounted to the reciprocating generator coil 16 between linear bearings 22. Electromagnetic windings 37 are wrapped on the outer poles 31. A plurality of electromagnetic windings 37 are mounted in series with the permanent magnets 21 along the outside diameter of the annular bore and are electrically coupled to the generator coil 16 to thereby generate an electromagnetic field within the annular bore when the magnetic core moves relative to the generator coil and permanent magnet magnetic field to increase the magnetic field in the magnetic core. The dampening plate supports 20 connect the upper and lower dampening plates 18 respectively creating structural strength for resistance to movement of the generator coil 16 in the fluid. The buoyancy tanks 23 are attached to the generator coil 16 such that the generator coil is suspended in the fluid at a depth below the buoy as to be in a vertical center location of the annular bore during times when oscillating fluid has no oscillations on its surface.

It should be clear at this time that a reciprocating generator power buoy 10 has been provided to create electric power from the surface ocean swells. The magnetic housing reciprocates linearly in response to an external force acting on the buoy by the passing ocean swell while a rigid connecting structure holds the reciprocating generator beneath the buoy. The rigid connecting structure places the generator at a depth below the ocean surface not effected by the surface ocean swells. Dampening plates 18 rigidly attached to the generator coil 16 to maintain the coil in a stable position with respect to the linear motion of the magnetic housing. A magnetic field focused through the generator coil 16 and motion of the magnetic housing causes the magnetic field to move through the generator coil. The relative motion of the magnetic field through the generator coil 16 creates an electromotive force (emf) in the coil. A small portion of the electric power created in the generator coil passes through the plurality of electromagnetic windings placed in series with the plurality of permanent magnets, increasing the magnetic field and hence the power output to the generator. It should be clear at this time, however, that the present invention is not to be considered as limited to the forms shown, which are to be considered illustrative rather than restrictive.

I claim:

1. A reciprocating electric generator for use in an oscillating fluid comprising:

a magnetic core having a magnetic center pole and radially configured outer poles to form an elongated annular bore extending thereinto and capped on both ends, said magnetic core being adapted to be submerged in an oscillating fluid;

a plurality of permanent magnets mounted in said magnetic core along the outside diameter of said annular bore;

a generator coil formed on a bobbin and slidably mounted in said annular bore;

damping plates rigidly attached to the upper and lower ends of said generator coil at a minimum of three equally spaced angular locations and extending out from said generator coil for resisting the movement of generator coil to applied forces on the coil, thereby maintaining the generator coil in a stable position;

said magnetic core having at least three linear spaces in the outside diameter of said annular bore to allow said damping plates to extend out from the said generator coil;

vertical structural members connecting said upper and lower damping plates to form a rigid structure;

buoy member floating on the surface of an oscillating fluid; and a rigid structure rigidly attached to the underside of said buoy member to hold said magnetic core and said generator coil at a predetermined fixed distance beneath said buoy member; whereby said magnetic core moves responsive to movement of said buoy on an oscillating fluid and said generator coil remains in a steady position with respect to the moving magnetic core to thereby produce electric power responsive to the movement of a buoy when positioning said buoy to float on an oscillating fluid.

2. The reciprocating electric generator for use in an oscillating fluid in accordance with claim 1 having linear bearing material mounted linearly along the sides of said gaps in said annular bore to aid in the slidability of the magnetic core damping plates.

3. The reciprocating electric generator for use in an oscillating fluid in accordance with claim 1 including a plurality of permanent magnets mounted along the inside diameter of said annular bore.

4. The reciprocating electric generator for use in an oscillating fluid in accordance with claim 1 having a plurality of electromagnetic windings mounted in series with said permanent magnets along the outside diameter of said annular bore and being electrically coupled to said generator coil to thereby generate an electromagnetic field within said annular bore when said magnetic core moves relative to said generator coil and permanent magnet magnetic field, thereby increasing the magnetic field in the magnetic core.

5. The reciprocating electric generator for use in an oscillating fluid in accordance with claim 1 in which the upper damping plates extend out from the top of the generator coil and connect to a flat ring encircling the outside of said generator and the lower generator coil damping plates connect to a flat ring that encircles the outside of the generator and said structural members connect the upper and lower damping plates and rings to provide structural strength where said rings increase the damping plate surface area and create more resistance to the generator coil movement in the still fluid.

6. A reciprocating electric generator for use in an oscillating fluid in accordance with claim 1 including a plurality of neutral buoyancy tanks attached to said generator coil such that said generator coil is suspended in a fluid at a depth below the buoy in the vertical center location of said annular bore during times when the oscillating fluid has no oscillations on its surface.

7. A reciprocating electric generator for use in an oscillating fluid in accordance with claim 1 including energy absorbers mounted at each end of said generator to cushion the impact when said generator housing makes contact with the generator coil during large swells that exceed the maximum stroke length of the generator.

* * * * *